US008457383B2

(12) United States Patent (10) Patent No.: US 8,457,383 B2
Imae et al. (45) Date of Patent: Jun. 4, 2013

(54) RECORDING DEVICE AND CONTROL METHOD FOR A RECORDING DEVICE

(75) Inventors: Toshihiro Imae, Matsumoto (JP); Masashi Fujikawa, Hara-mura (JP); Yoshiaki Kinoshita, Hata-machi (JP); Morimichi Mizuno, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 697 days.

(21) Appl. No.: 12/705,283

(22) Filed: Feb. 12, 2010

(65) Prior Publication Data

US 2010/0208977 A1 Aug. 19, 2010

(30) Foreign Application Priority Data

Feb. 16, 2009 (JP) ................................. 2009-032286

(51) Int. Cl.
*G06K 9/00* (2006.01)
(52) U.S. Cl.
USPC ............................ 382/139; 382/181; 358/301
(58) Field of Classification Search
None
See application file for complete search history.

(56) References Cited

U.S. PATENT DOCUMENTS

| 4,461,028 | A  | * | 7/1984  | Okubo          | 382/115 |
|-----------|----|---|---------|----------------|---------|
| 5,438,186 | A  | * | 8/1995  | Nair et al.    | 235/449 |
| 6,986,464 | B2 | * | 1/2006  | Takiguchi et al. | 235/449 |
| 7,258,500 | B2 |   | 8/2007  | Furihata et al. |         |
| 7,435,023 | B2 | * | 10/2008 | Sasaki et al.  | 400/607.2 |
| 7,770,793 | B2 | * | 8/2010  | Sasaki et al.  | 235/449 |
| 8,023,718 | B1 | * | 9/2011  | Gudenburr et al. | 382/139 |
| 2004/0217170 | A1 | * | 11/2004 | Takiguchi et al. | 235/449 |
| 2005/0127160 | A1 | * | 6/2005  | Fujikawa       | 235/379 |
| 2007/0291328 | A1 |   | 12/2007 | Furihata et al. |         |
| 2010/0092066 | A1 | * | 4/2010  | Shizuka et al. | 382/140 |
| 2012/0217188 | A1 | * | 8/2012  | DeWitt et al.  | 209/576 |

FOREIGN PATENT DOCUMENTS

| EP | 0 651 345 A2   | 5/1995  |
|----|----------------|---------|
| EP | 0 996 936 B1   | 5/2001  |
| JP | 05-258100 A    | 10/1993 |
| JP | 07-182448 A    | 7/1995  |
| JP | 2001-022878 A  | 1/2001  |
| JP | 2001-026158 A  | 1/2001  |
| JP | 2003-272030 A  | 9/2003  |
| JP | 2004-259254 A  | 9/2004  |
| JP | 2006-155458 A  | 6/2006  |

OTHER PUBLICATIONS

Olivetti S.p.A.; Brochure for "PR2 Plus Specialised Printer"; Feb. 2010; Olivetti S.p.A.; Italy.

\* cited by examiner

*Primary Examiner* — Manav Seth
(74) *Attorney, Agent, or Firm* — Kilpatrick Townsend & Stockton LLP

(57) ABSTRACT

A recording device and a control method for a recording device improve the accuracy of reading MICR information while also shortening the time required for recording media processing. A dot impact printer 10 has a magnetic head 34 that magnetically reads MICR information recorded on a recording medium S, a recording head 18 that is mounted on a different carriage than the magnetic head 34 and records images on the recording medium S, and a back scanner 112 that optically reads MICR information recorded on the recording medium S, disposed sequentially to the transportation path P of the recording medium S. When reading the MICR information by means of the magnetic head 34 does not succeed, the recording medium S is conveyed to the back scanner 112, the MICR information is read by the back scanner 112, the reading results are compared, and the MICR information is identified.

19 Claims, 7 Drawing Sheets

RECORDING DEVICE AND CONTROL METHOD FOR A RECORDING DEVICE

This application claims priority to Japanese Patent Application No. 2009-032286, filed Feb. 16, 2009, the entirety of which is incorporated by reference herein.

BACKGROUND

1. Technical Field

The present invention relates to recording devices and related methods for reading magnetic ink character recognition (MICR) information.

2. Related Art

Devices for reading MICR information that is recorded in magnetic ink on recording media such as checks are known. Some of these devices improve recognition accuracy by combining the result of magnetically reading the MICR information with the result of optically reading the MICR information to identify the MICR information. See, for example, Japanese Unexamined Patent Appl. Pub. JP-A-H05-258100.

A problem with such devices is that when a reading unit that reads the MICR information magnetically and a reading unit that reads the MICR information optically are both disposed in a single device, the time required to process one piece of recording medium, such as one check, is increased because the recording medium must be conveyed to both reading units. In addition, when the transportation path is configured so that two reading units are collocated in order to shorten the processing time, the number of times the MICR information is read magnetically and the number of times the MICR information is read optically cannot be changed independently of the other. Additionally, checks that have been printed after reading the MICR information succeeds may be difficult to read optically again. Adapting such devices for use with recording media other than single forms such as checks, such as a bound recording media, may also be difficult.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Recording devices and related methods are provided for reading and processing magnetic ink character recognition (MICR) information recorded on a recording medium. The disclosed devices and methods may improve the accuracy of reading MICR information while also shortening the recording media processing time.

Thus, in a first aspect, a recording device is provided that conveys a recording medium along a transportation path and records images. The recording device includes a drive mechanism to convey the recording medium along the transportation path; a magnetic reading unit that is mounted on a first carriage disposed at a first position along the transportation path and magnetically reads magnetic ink character recognition (MICR) information recorded on the recording medium; a recording head that is mounted on a second carriage disposed at a second position along the transportation path and records images on the recording medium; an optical reading unit disposed at a third position along the transportation path that optically reads MICR information recorded on the recording medium; and a control unit operatively coupled with the drive mechanism, the magnetic reading unit, the recording head, and the optical reading unit. The first, second, and third positions are three different positions along the transportation path. The first carriage is different from the second carriage. When the MICR information is not successfully read by the magnetic reading unit, the control unit conveys the recording medium to the optical reading unit, reads the MICR information by means of the optical reading unit, compares a first reading result from the magnetic reading unit and a second reading result from the optical reading unit, and identifies the MICR information in response to the first and second reading results.

A recording device according to the first aspect identifies MICR information that is difficult to recognize with high accuracy by comparing the result of magnetically reading MICR information recorded on the recording medium with the result of optically reading the MICR information, and conveys the recording medium to an optical reading unit when magnetically reading the MICR information does not succeed. As a result, by not conveying the recording medium to the optical reading unit when magnetically reading the MICR information succeeds, unnecessary transportation operations may be eliminated, MICR information reading accuracy may be improved, and the processing speed may be improved.

Furthermore, because the magnetic reading unit is mounted on a first carriage at a first position along the transportation path, the recording head is mounted on a second carriage that is different than the first carriage, and the optical reading unit is disposed at a different position along the transportation path than the first and second carriages, the magnetic reading unit and the recording head can be moved mutually independently by the first and second carriages. As a result, different types of recording media, including bound media and single sheet media, can be magnetically read and images can be recorded thereon, and a single device that is compatible with a wide range of recording media can be achieved.

In many embodiments, the control unit determines if the recording medium is a slip on which the MICR information is recorded, or is an other type of recording medium having a magnetic recording unit in which magnetic information can be recorded, and if the recording medium is determined to be the other type of recording medium, the control unit at least one of reads or writes to the magnetic recording unit of the recording medium via the magnetic reading unit.

In addition to individual slips having MICR information recorded thereon, other types of recording media having a magnetic recording unit in which magnetic information can be recorded can be processed, MICR information can be read with a high degree of accuracy at a high speed, and magnetic information can be read from and/or recorded to the magnetic recording unit of the recording medium. As a result, a recording device that is outstanding at processing MICR information and is compatible with a wide range of recording media can be achieved.

In many embodiments, the recording device is configured to enable communication between the control unit and an externally connected host computer. And the control unit can determine whether the recording medium is a slip on which the MICR information is recorded or is the other type of recording medium based on information sent from the host computer.

Thus, whether the recording medium is a single form on which MICR information is recorded, or is another type of recording medium, can be accurately determined based on information from the host computer. In addition, by previously receiving the information from the host computer and preparing for processing either type of recording medium, processing can be completed quickly.

In many embodiments, the recording device includes a detection means that detects an edge position of the recording medium. And the control unit can determine a range to be read by the optical reading unit based on the edge position detected by the detection means.

Thus, the processing of the recording medium can be further accelerated by avoiding the reading unnecessary areas because the area to be read by the optical reading unit is determined based on an edge position of the recording medium.

In many embodiments, the detection means includes a media width sensor to determine a width and a position of the recording medium transverse to the transportation path. The media width sensor can be mounted on the first carriage or the second carriage.

In many embodiments, the detection means includes a media end sensor disposed along the transportation path. The media end sensor is operable to detect the presence of the recording medium on the transportation path and to detect a position of a trailing end of the recording medium along the transportation path.

In many embodiments, the recording device includes an alignment mechanism to align and position a leading end of the recording medium. The alignment mechanism can be disposed along the transportation path.

In many embodiments, the recording device includes an insertion opening through which the recording medium is inserted to the transportation path and discharged from the transportation path. The recording head can be disposed between the optical reading unit and the insertion opening. And the magnetic reading unit can be disposed between the recording head and the insertion opening.

In many embodiments, the optical reading unit includes a front scanner and a back scanner. The front scanner can be disposed to optically read information printed on a front side of the recording medium opposite to a back side of the recording medium where the MICR information is recorded. And the back scanner can be disposed to optically read information printed on the back side of the recording medium.

In many embodiments, the drive mechanism includes a media feed motor. The media feed motor can be coupled with a plurality of drive rollers to transport the recording medium along the transportation path.

In many embodiments, the magnetic reading unit includes a magnetic reading unit drive motor. The magnetic reading unit drive motor moves the magnetic reading unit along the first carriage transverse to the transportation path.

In many embodiments, the control unit includes a collection of interconnected components. For example, the control unit can include a motor driver connected to the media feed motor, to the carriage drive motor, and to the magnetic reading unit drive motor. The motor driver can operate the motors by supplying a drive signal to each of the motors. The control unit can include a gate array connected to the motor driver, to the magnetic reading unit, and to the optical reading unit. The control unit can include a processor connected to the gate array, and can include a memory connected to the processor and containing instruction executable by the processor. The instruction, when executed, can cause the processor to control the motors via the motor driver, control the recording head via the gate array, process a signal generated by the gate array in response to a signal from the magnetic reading unit to identify MICR information recorded on the recording medium, and process a signal generated by the gate array in response to a signal from the optical reading unit to identify MICR information recorded on the recording medium. And the control unit can include a communication interface connected to the processor and operable to transmit the identified MICR information to a host computer.

In another aspect, a method is provided for reading magnetic ink character recognition (MICR) information recorded on a recording medium. The method includes conveying a recording medium along a transportation path to a magnetic reading unit, reading the MICR information with the magnetic reading unit, identifying MICR information recorded on the recording medium in response to the reading of the MICR information with the magnetic reading unit, and determining whether some of the recorded MICR information could not be identified. The method includes further steps taken in response to determining that some of the recorded MICR information was not identified. These steps include conveying the recording medium along the transportation path to an optical reading unit disposed at a different position along the transportation path than the magnetic reading unit, reading the MICR information with the optical reading unit, identifying MICR information recorded on the recording medium in response to the reading of the MICR information with the optical reading unit, and identifying the MICR information recorded on the recording medium by combining the MICR information identified via the magnetic reading unit with the MICR information identified via the optical reading unit.

With such a method, unnecessary transportation operations can be eliminated, MICR information reading accuracy can be improved, and the speed at which a recording medium is processed can be improved by not conveying the recording medium to the optical reading unit when magnetically reading the MICR information succeeds.

The method for reading MICR information can include further steps. For example, the method can include conveying the recording medium along the transportation path to contact an alignment feature to align the recording medium relative to the transportation path and to determine a position of the recording medium along the transportation path. The method can include measuring a position of a trailing end of the recording medium along the transportation path with a media end sensor disposed along the transportation path, measuring a width of the recording medium and a position of the recording medium transverse to the transportation path, and determining a portion of the recording medium to be read by at least one of the magnetic reading unit or the optical reading unit. The method can include steps accomplished in response to a successful identification of all the MICR information recorded on the recording medium. Such steps can include transmitting the identified MICR information to a host computer, receiving a command from the host computer to print an endorsement on the recording medium, conveying the recording medium to a recording head, and printing the endorsement on the recording medium with the recording head. The method can include steps accomplished in response to an unsuccessful identification of all the MICR information on the recording medium, for example, displaying an error message. And the method can include transmitting an image of the recording medium captured by the optical reading unit to a host computer.

In many embodiments, the recording medium processed is a check.

In another aspect, a method is provided for recording an image on a recording medium. The method includes inserting a recording medium to a transportation path, conveying the recording medium along the transportation path to contact an alignment feature to align the recording medium relative to the transportation path and to determine a position of the recording medium along the transportation path, at least one of reading or writing information on the recording medium with a magnetic head, conveying the recording medium along the transportation path from the magnetic head to a recording head, and printing an image on the recording medium with the recording head.

The above-described recording devices and methods may improve the accuracy of reading MICR information. And they may improve the speed at which recording mediums having MICR information are processed.

Other objects and attainments together with a fuller understanding of the invention will become apparent and appreciated by referring to the following description and claims taken in conjunction with the accompanying drawings.

DETAILED DESCRIPTION

In the following description, various embodiments of the present invention will be described. For purposes of explanation, specific configurations and details are set forth in order to provide a thorough understanding of the embodiments. However, the present invention can be practiced without the specific details. Furthermore, well-known features may be omitted or simplified in order not to obscure the embodiment being described.

Figure 1:
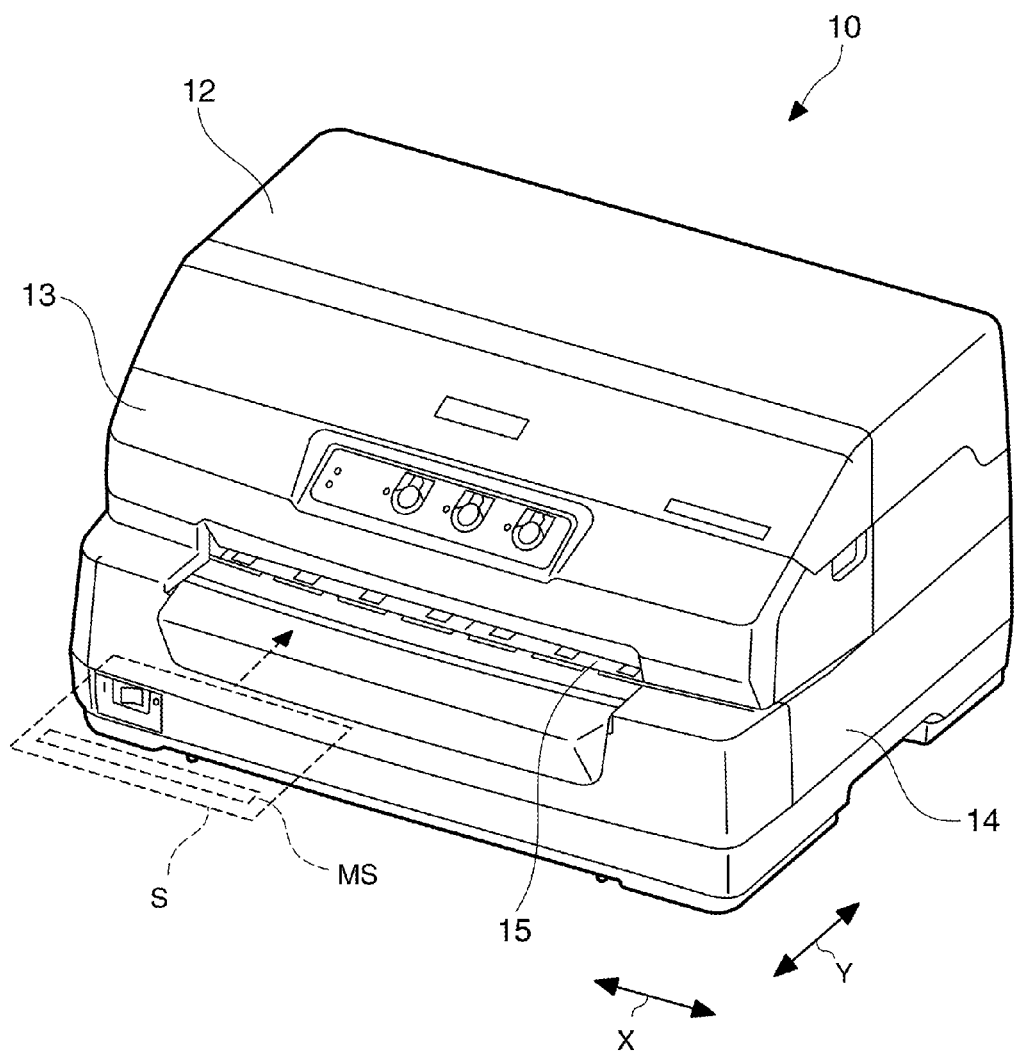
FIG. 1 is an external oblique view of a dot impact printer in accordance with many embodiments.
Figure 2:
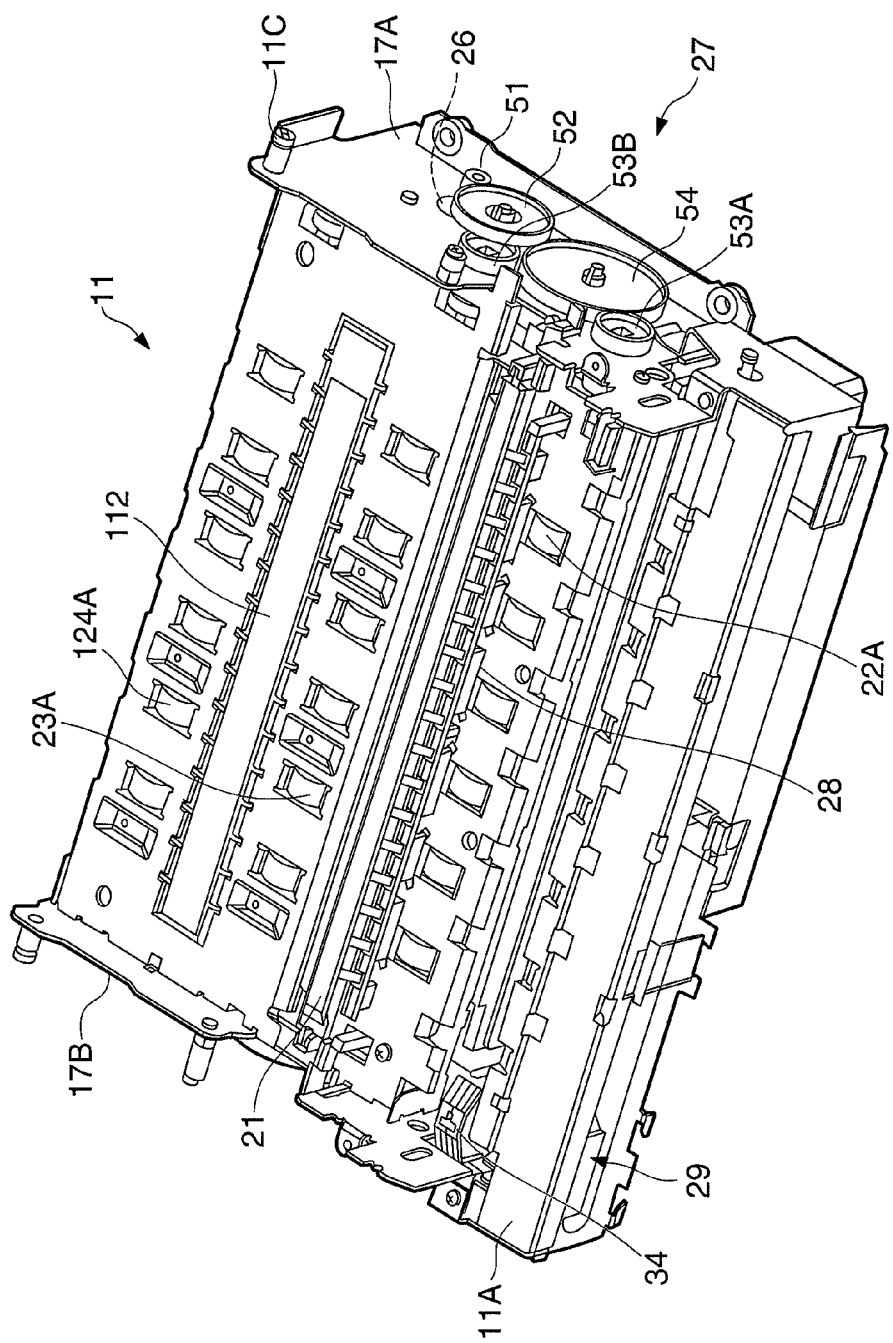
FIG. 2 is a front oblique view of a printer chassis of the printer of FIG. 1.
Figure 3:
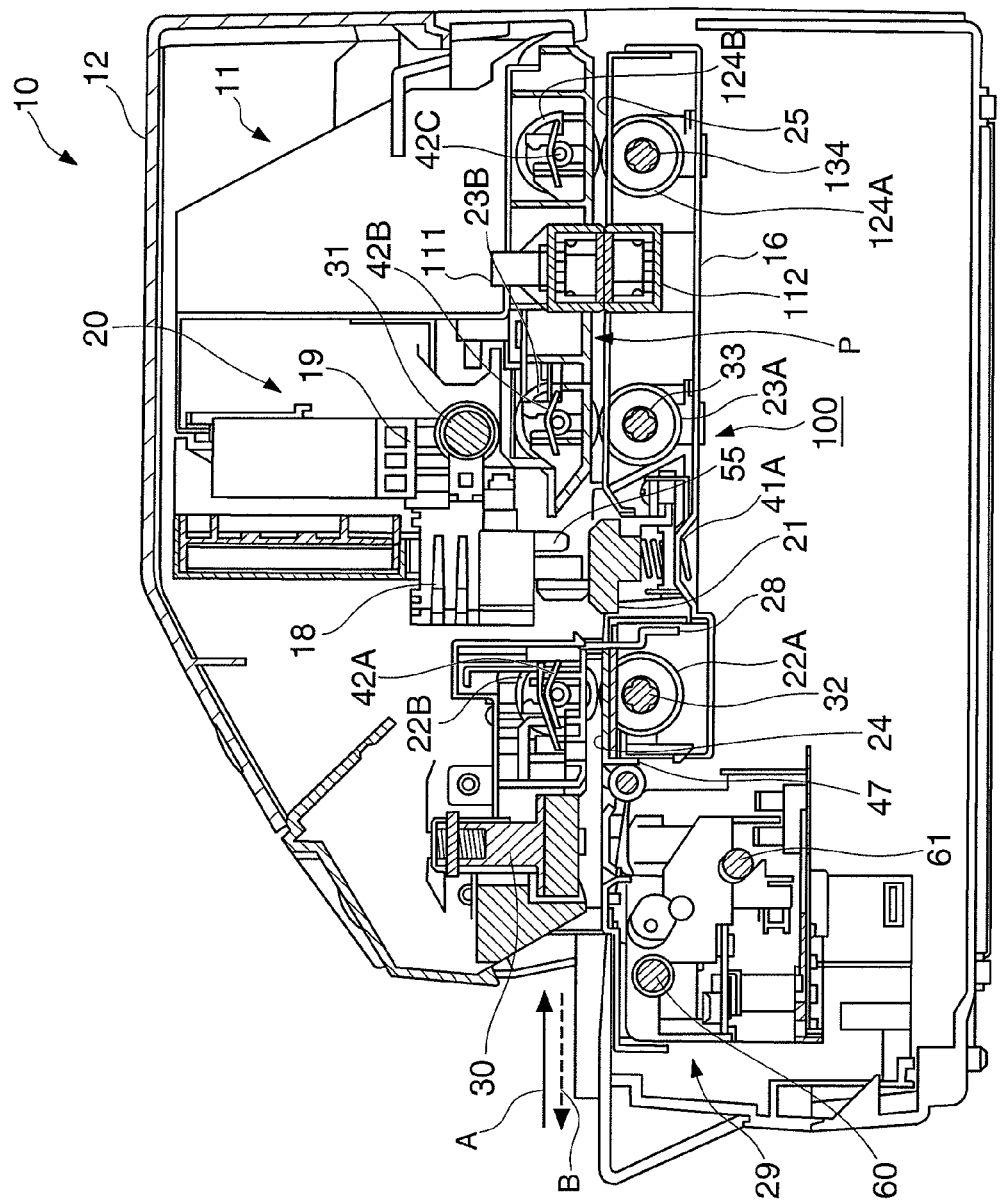
FIG. 3 is a side section view of the printer of FIG. 1.

Referring now to the drawings, in which like reference numerals represent like parts throughout the several views, FIG. 1 is a front oblique view of a dot impact printer 10 as an example of a recording device in accordance with many embodiments. FIG. 2 is a front oblique view of a printer chassis 11 of the printer 10. FIG. 3 is a side section view of the dot impact printer 10 shown in FIG. 1.

The dot impact printer 10 shown in FIG. 1 as a recording device records images, including text, by pushing a plurality of recording wires disposed to a print head 18 (see FIG. 2 and FIG. 3) against the recording medium S with an ink ribbon (not shown in the figure) delivered from a ribbon cartridge (not shown in the figure) disposed therebetween to form dots on the recording surface of the recording medium S.

Cut media that is pre-cut to a specific length, and continuous paper having a plurality of continuously connected sheets, for example, can be used as the recording medium S in the dot impact printer 10. Cut media include various kinds of forms and multipart forms, postcards, passbooks, and envelopes, and continuous paper includes continuous multipart form paper.

The dot impact printer 10 records images on a recording medium S (shown in FIG. 1). The recording medium S can be a check or promissory note (collectively referred to as simply "checks" below) issued by a bank or other financial institution, for example. Such checks are referred to herein as "slips" on which MICR (magnetic ink character recognition) information S is printed in magnetic ink.

A passbook instead of a check can also be used as the recording medium S with this dot impact printer 10. A passbook has plural sheets of recording media bound into a small booklet, and the inside pages exposed by opening the booklet are the recording surfaces. A magnetic stripe can be disposed on the outside surface of the back cover of the booklet. Various information can be magnetically recorded in and can be read from this magnetic stripe, and the recorded information cannot usually be read optically, including by visual inspection.

Note that the recording medium S has four sides, the side from which the recording medium is inserted to the dot impact printer 10 is referred to herein as the "leading" end, and the side opposite to the leading end is referred to as the "trailing" end of the recording medium.

As shown in FIG. 1, the outside body of the dot impact printer 10 includes a top cover 12, a top case 13, and a bottom case 14. A manual insertion opening 15 through which the recording medium S is inserted and discharged is rendered in the front of the top case 13 and bottom case 14. The side in which the manual insertion opening 15 is rendered, that is, the left side as seen in FIG. 3, is referred to herein as the front side, and the opposite or right side as seen in FIG. 3 is referred to as the rear or back side.

As shown in FIG. 2, the dot impact printer 10 includes a printer chassis 11 that is covered by the top cover 12, the top case 13, and the bottom case 14.

The printer chassis 11 has a bottom unit 11A and a top unit (not shown in the figure) that is supported on a shaft 11C at the back end part of the bottom unit 11A. This bottom unit 11A is housed in the top case 13 and bottom case 14 (FIG. 1), and the top unit is fastened to the top cover 12 (FIG. 1). When the top cover 12 is opened, the top unit pivots on the shaft 11C and the inside of the printer chassis 11 is exposed.

As shown in FIG. 2 and FIG. 3, the printer chassis 11 has a main frame, a media transportation mechanism 100, a recording mechanism unit 20 having a print head 18 and a carriage 19, an alignment plate 28 that aligns the recording medium S, a magnetic data reading unit 29, and a media pressure unit 30.

The main frame includes a base frame 16, right side frame 17A, and a left side frame 17B.

The media transportation mechanism 100 includes a platen 21, a first drive roller 22A, a first follower roller 22B, a second drive roller 23A, a second follower roller 23B, a third drive roller 124A, a third follower roller 124B, a front media guide 24, a rear media guide 25, a media feed motor 26, and a drive gear train 27.

The magnetic data reading unit 29 has a magnetic head 34 (corresponding to the "magnetic reading unit" in the accompanying claims) for reading the MICR information MS recorded on the recording medium S.

The media pressure unit 30 presses the recording medium S down from above so that the recording medium S does not lift up during magnetic information processing, which includes reading the MICR information MS.

The right side frame 17A and the left side frame 17B are attached rising from the opposite sides of the base frame 16. A carriage guide shaft 31 is disposed spanning the gap between these side frames 17A and 17B, and the flat front media guide 24 and rear media guide 25 are disposed fixed between the side frames 17A and 17B. The flat platen 21 is disposed between the front media guide 24 and the rear media guide 25. The recording head 18 is disposed above the platen 21 in opposition to the platen 21.

The carriage 19 is mounted and slides freely on the carriage guide shaft 31, is driven through an intervening timing belt (not shown in the figure) by the forward or reverse rotation of the carriage drive motor 56 that drives the carriage 19, and is moved bidirectionally guided by the carriage guide shaft 31. The direction of carriage 19 movement is denoted by arrow X in the figures, that is, the main scanning direction matching the axial direction of the carriage guide shaft 31 and the lengthwise direction of the platen 21. The range of carriage 19 movement (scanning) is between the pair of side frames 17A and 17B. The direction perpendicular to the main scanning direction X of the carriage 19, that is, the direction indicated by arrow Y in the figures, is the subscanning direction.

While the carriage 19 travels in the main scanning direction, the recording head 18 mounted on the carriage 19 drives the recording wires to protrude from the wire dot face (not shown in the figure) opposite the platen 21 on the distal end of the recording head 18 to strike the ink ribbon, thereby transferring ink from the ink ribbon to the recording medium S conveyed between the platen 21 and the recording head 18, and recording text or other image on the recording medium S. The ink ribbon is stored folded together in a ribbon cartridge (not shown in the figure) that is mounted on the main frame or the carriage 19, and is advanced in conjunction with the scanning motion of the carriage 19.

The platen 21 is flat and extends in the scanning direction of the carriage 19, and the ends of the platen 21 are elastically supported and urged toward the recording head 18 by an urging spring 41A. The urging spring 41A is a compression spring, and the driving force of the recording wires is supported by the urging force of the urging spring 41A during the recording operation of the recording head 18. If the thickness of the recording medium S changes while the recording medium S is conveyed, or if recording media S of different thicknesses are inserted to the printer chassis 11, the platen 21 is pushed by the distal end of the recording head 18 and moves in the direction away from the recording head 18 in resistance to the urging force of the urging spring 41A. As a result, a constant gap is maintained between the distal end of the recording head 18 and the recording surface of the recording medium S regardless of the thickness of the recording medium.

The media transportation mechanism 100 is configured with the first drive roller 22A and first follower roller 22B disposed on the front side of the printer chassis 11 relative to the platen 21 and recording head 18; the second drive roller 23A and second follower roller 23B disposed on the rear side of the printer chassis 11 and the front side of the back scanner 112 (corresponding to an "optical reading unit" in the accompanying claims) relative to the platen 21 and recording head 18; and the third drive roller 124A and third follower roller 124B are disposed on the rear side of the back scanner 112.

The first drive roller 22A and first follower roller 22B render a roller pair disposed one above the other, the second drive roller 23A and second follower roller 23B render another roller pair disposed one above the other, and the third drive roller 124A and third follower roller 124B render another roller pair disposed one above the other.

The first drive roller 22A, second drive roller 23A, and third drive roller 124A are drive rollers that are rotationally driven by the media feed motor 26 and drive gear train 27, and the first follower roller 22B, second follower roller 23B, and third follower roller 124B are follower rollers that are urged with specific pressure to the first drive roller 22A, second drive roller 23A, and third drive roller 124A sides by springs 42A, 42B, and 42C, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The back scanner 112 is an optical image sensor that is disposed between the second drive roller 23A and the third drive roller 124A and reads information printed on the back of the recording medium S.

The front scanner 111 is an optical image sensor that is disposed at a position opposite the back scanner 112, and reads information printed on the front of the recording medium S.

Note that the front scanner 111 and the back scanner 112 each have a light unit (not shown in the figure) that emits white visible light output from a fluorescent light or LED, for example, onto the reading area of the recording medium S, a plurality of photosensors (not shown in the figure) arrayed in a line in the main scanning direction X, and an output unit (not shown in the figure) that outputs the signals from the photosensors to a gate array 45 (shown in FIG. 5) in a specified sequence.

The drive gear train 27 is disposed on the outside side of the right side frame 17A. The drive gear train 27 has a motor pinion 51 that is fixed to rotate in unison with the drive shaft of the media feed motor 26, which can turn forward or in reverse.

Drive power from this motor pinion 51 is transferred through a speed-reducing gear 52 to a second drive gear 53B, which is attached to the second roller shaft 33 of the second drive roller 23A; then from this second drive gear 53B through an intermediate gear 54 to a first drive gear 53A, which is attached to the first roller shaft 32 of the first drive roller 22A.

The torque of the second roller shaft 33 of the second drive roller 23A is transferred by a drive belt (not shown in the figure), for example, to the third roller shaft 134 of the third drive roller 124A.

As a result, the first drive roller 22A, second drive roller 23A, and third drive roller 124A shown in FIG. 3 rotate in the same direction, and can convey the recording medium S inside the printer chassis 11. More specifically, the first drive roller 22A, second drive roller 23A, and third drive roller 124A convey the recording medium S inside the printer chassis 11 in the subscanning direction as denoted by arrow A in FIG. 1 when the media feed motor 26 turns forward, and convey the recording medium S in the direction of discharge from the printer chassis 11 as denoted by arrow B in FIG. 1 when the media feed motor 26 turns in reverse.

A media end sensor 47 that detects whether or not a recording medium S is on the recording medium S transportation path is disposed on the front side of the first drive roller 22A. The media end sensor 47 is a reflection photosensor having a light source that emits light to the transportation path and a photoreceptor unit that detects the reflected light, or a transmission photosensor having the light source and photoreceptor unit disposed in opposition with the transportation path therebetween. The media end sensor 47 is a sensor for detecting if a recording medium S has been inserted from the manual insertion opening 15, and detecting completion of discharging a recording medium S from the printer chassis 11.

The media width sensor 55 is mounted on the carriage 19, and scans over the platen 21 with the carriage 19. A recording medium S can therefore be detected by the media width sensor 55 when the carriage 19 scans, and the position of the recording medium S can be determined by correlating the detected position with the scanning position of the carriage 19.

Figure 4:
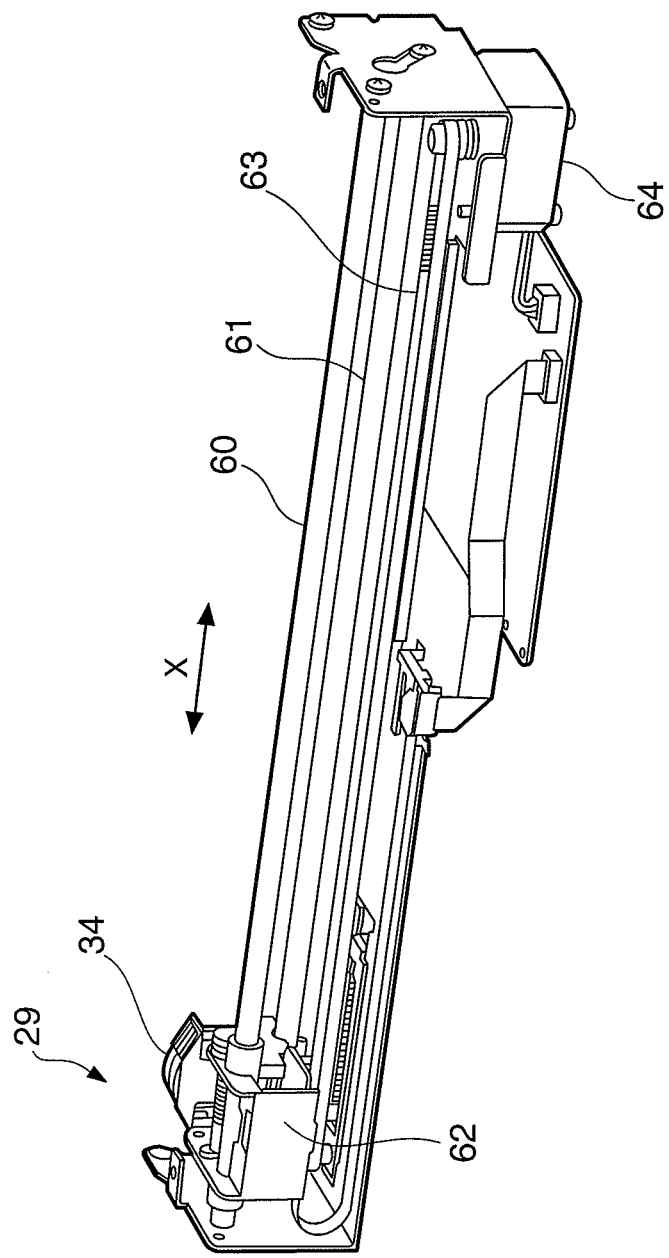
FIG. 4 is an oblique view illustrating a magnetic data reading unit of the printer of FIG. 1.

FIG. 4 is an oblique view showing the configuration of the magnetic data reading unit 29.

The magnetic data reading unit 29 has two magnetic head guide shafts 60, 61 disposed parallel to the lengthwise direction of the printer chassis 11 (the direction of arrow X in the figure), a magnetic head unit 62 that is supported on the magnetic head guide shafts 60, 61 and travels bidirectionally in this lengthwise direction, a magnetic head drive belt 63 of which a part is affixed to the magnetic head unit 62, and a magnetic head drive motor 64 that drives the magnetic head drive belt 63 rotationally so that the magnetic head unit 62 moves bidirectionally.

The magnetic head unit 62 has a magnetic head 34 that scans the MICR information MS on the recording medium S when driven by the magnetic head drive belt 63. This magnetic head 34 executes a magnetic information process to read character information recorded in the MICR information MS by scanning the MICR information MS. In this embodiment, the magnetic head 34 is disposed on the manual insertion opening 15 side of the printer chassis 11, and is disposed in series to the recording head 18 in the recording medium S transportation direction.

Figure 5:
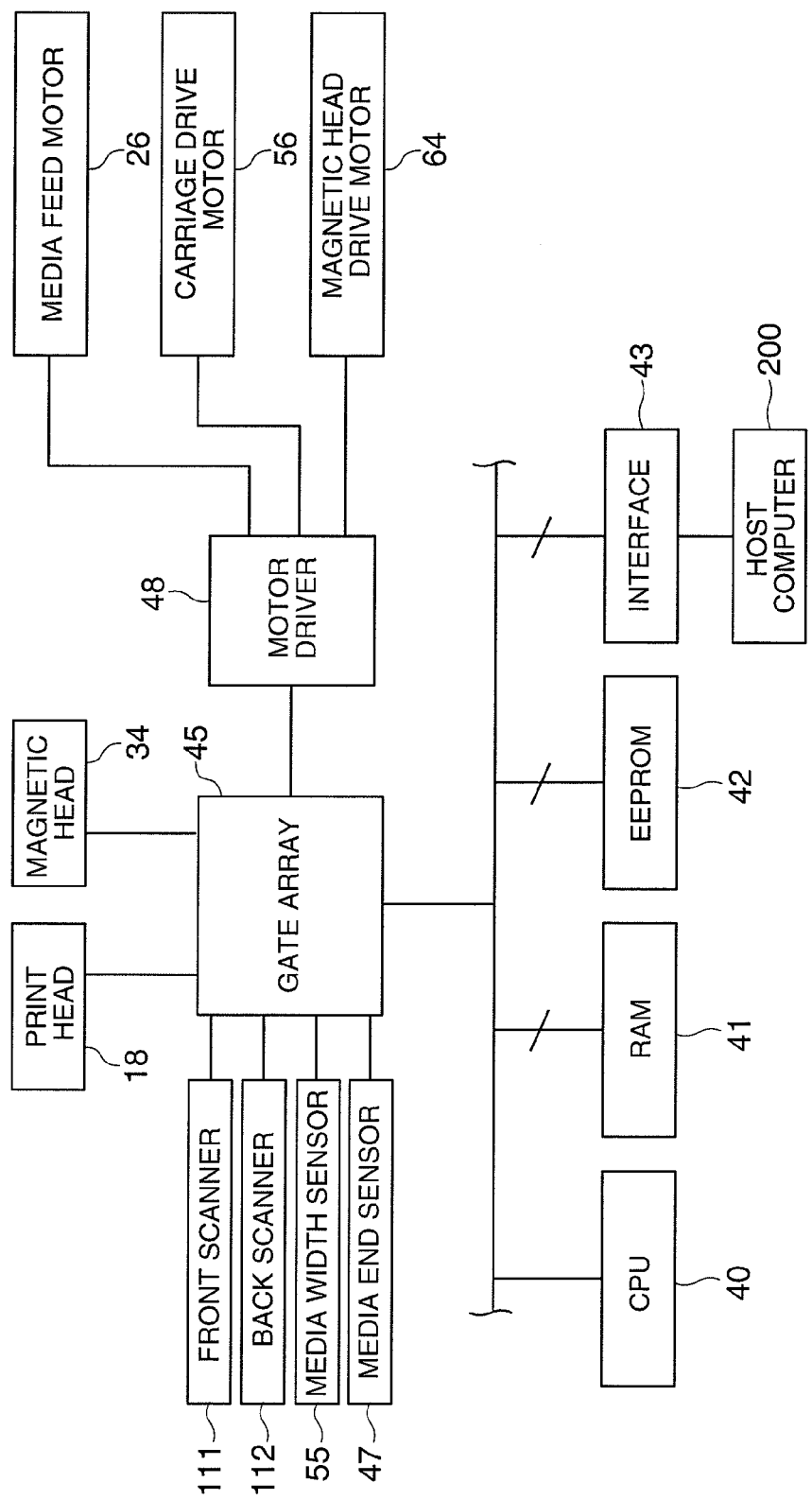
FIG. 5 is a block diagram showing the functional configuration of the printer of FIG. 1.

FIG. 5 is a block diagram showing the functional configuration of the dot impact printer 10.

The dot impact printer 10 has a CPU 40 that controls overall operation of the dot impact printer 10 based on a control program, EEPROM 42 for storing the control program executed by the CPU 40 and processed data, for example, RAM 41 for temporarily storing the control program read from the EEPROM 42 and data, and an interface 43 for converting the data format of information communicated between the dot impact printer 10 and the host computer 200 that controls the dot impact printer 10.

The recording head 18 and magnetic head 34 are connected to the CPU 40 through a gate array 45. The gate array 45 outputs drive current to the recording head 18 as controlled by the CPU 40, and causes the recording wires to protrude. As also controlled by the CPU 40, the gate array 45 outputs reading current to the magnetic head 34 when reading magnetic information, and digitizes and outputs to the CPU 40 the signal current input from the magnetic head 34.

The media end sensor 47, media width sensor 55, front scanner 111, and back scanner 112 are connected to the gate array 45.

The media end sensor 47 is disposed on the front side of the first drive roller 22A (FIG. 3) as described above, and is a sensor for detecting the leading end or the trailing end of the recording medium S.

The media width sensor 55 is mounted on the carriage 19, and is positioned beside the wire dot face (not shown in the figure) of the recording head 18 opposite the platen 21. More specifically, the media width sensor 55 is a reflection photosensor having a light source that emits light to the platen 21 and a photoreceptor unit that detects the reflection of the light from this light source, and detects if recording medium S is present between the carriage 19 and the platen 21.

The media end sensor 47 and the media width sensor 55 operate according to the drive current input from the gate array 45, and output analog voltages representing the detected values to the gate array 45.

The gate array 45 then quantizes and digitizes the analog voltages input from the media end sensor 47 and the media width sensor 55, and outputs to the CPU 40.

The front scanner 111 reads and supplies to the gate array 45 the information that is printed on the front of the recording medium S (that is, the surface on the opposite side as the side on which the MICR information is printed).

The back scanner 112 reads and supplies to the gate array 45 the information that is printed on the back of the recording medium S (that is, the side on which the MICR information is printed).

The gate array 45 quantizes the analog voltages supplied from the front scanner 111 and the back scanner 112, and outputs the resulting digital data to the CPU 40.

A motor driver 48 is also connected to the gate array 45. The motor driver 48 is connected to the media feed motor 26, carriage drive motor 56, and magnetic head drive motor 64, and operates the motors by supplying drive current and drive pulses to each of the motors. Note that an alignment plate motor (not shown in the figure) for operating the alignment plate 28 (FIG. 3), for example, can also be connected to the motor driver 48.

Based on a control program stored in EEPROM 42, the CPU 40 controls the recording head 18 and motor driver 48, and acquires the detection results from the media end sensor 47 and media width sensor 55, through the gate array 45. The CPU 40 also drives the media feed motor 26 to convey the recording medium S in the subscanning direction Y, drives the carriage drive motor 56 to scan in the main scanning direction X, and drives the magnetic head drive motor 64 so that the magnetic head unit 62 scans in the main scanning direction X. The CPU 40 also controls the gate array 45 to drive the recording head 18 and impel the recording wires, or to execute the magnetic information process using the magnetic head 34.

The basic operation of the dot impact printer 10 is described next.

When a check is inserted as the recording medium S from the manual insertion opening 15 shown in FIG. 1, the recording medium S is gripped by the first drive roller 22A and first follower roller 22B and conveyed in the direction of arrow A to a position before the platen 21.

To correct any skew in the transportation direction of the recording medium S at this time, the alignment plate 28 protrudes into the transportation path P of the recording medium S. Skewing of the recording medium S is corrected and the recording medium S is aligned against the alignment plate 28 by continuing to drive the rollers after the recording medium S contacts the alignment plate 28.

The alignment plate 28 is then retracted from the transportation path P, the recording medium S is advanced to the range where the media width can be detected by the media width sensor 55, and the position of the recording medium S is detected by the media width sensor 55 while the carriage 19 scans in the main scanning direction.

The recording medium S is then advanced to the position where the MICR information MS can be read by the magnetic data reading unit 29. The magnetic head 34 of the magnetic head unit 62 then reads the magnetic information encoded in the MICR information MS of the recording medium S as a result of the magnetic head drive motor 64 of the magnetic data reading unit 29 being driven and the magnetic head unit 62 supported on the magnetic head guide shafts 60, 61 moving in the main scanning direction X. Note that the position of the recording medium S detected by the media width sensor 55 is referenced at this time to scan the appropriate range.

The information read by the magnetic head 34 is digitized by the gate array 45 and output to the CPU 40. The CPU 40 interprets and converts the character data to text information based on the data supplied from the gate array 45. If the character information recorded as MICR information can be interpreted, the acquired text information is sent to the host computer 200.

The printer chassis 11 can then be conveyed to the position of the front scanner 111 and back scanner 112. The front and back sides of the recording medium S are then optically scanned, and the acquired information is converted in the gate array 45 to digital image information and supplied to the CPU 40. Note that the range scanned at this time can be determined based on the detection result of the media width sensor 55.

The CPU 40 sends the front and back image data supplied thereto to the host computer 200. The host computer 200 can process a transaction by transferring the received image data from the receiving bank to the paying bank.

If part, or all, of the text information recorded as MICR information cannot be interpreted, the CPU 40 executes a character recognition process based on the image data acquired from the back scanner 112, and converts the text array encoded in the MICR information to corresponding text data. If the CPU 40 successfully recognizes a character that could not be interpreted in the recognition process of the magnetic head 34, the successfully recognized character is added in place of the character that could not be interpreted, and the resulting text data is sent to the host computer 200.

When the scanning processes of the front scanner 111 and back scanner 112 are completed, the recording medium S can be conveyed to the printing position on the platen 21. Based on the magnetic information read by the magnetic data reading unit 29, information such as an endorsement indicating the check has been used is recorded on the recording surface of the recording medium S while the recording head 18 and carriage 19 move in the main scanning direction.

This recording operation of the recording head 18 is executed by repeating the operations of recording one line by means of the recording wires of the recording head 18 while the recording head 18 travels to the right or the left in the main scanning direction, and the foregoing rollers 22A, 22B and 23A, 23B advancing the recording medium S a specific distance (normally the line pitch) in the direction of arrow A or arrow B each time one line is recorded.

After printing is completed, the first drive roller 22A and first follower roller 22B convey the recording medium S in the direction of arrow B, and the recording medium S is discharged from the manual insertion opening 15.

Figure 6:
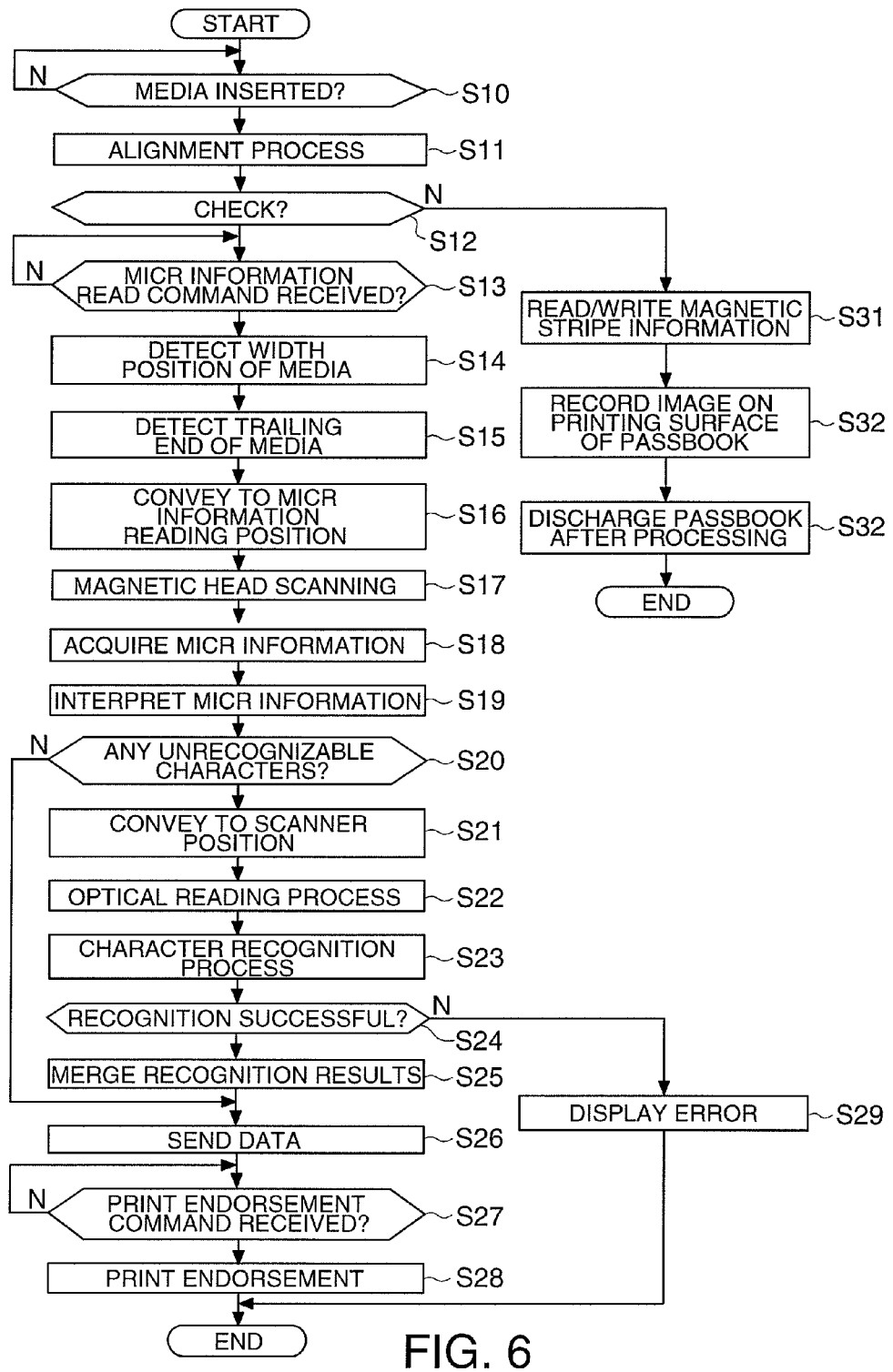
FIG. 6 is a flow chart of the operation of the printer of FIG. 1.

FIG. 6 is a flow chart describing the process executed when a check is inserted as the recording medium S to the dot impact printer 10.

When a recording medium S is inserted to the manual insertion opening 15 and the CPU 40 of the dot impact printer 10 detects the leading end of the recording medium S by means of the media end sensor 47 (step S10 returns Yes), the alignment plate 28 is driven to protrude into the transportation path P of the recording medium S, and the media feed motor 26 is driven to align and position the recording medium S (step S11). This corrects any skew in the transportation direction of the recording medium S and positions the leading end of the recording medium S.

The CPU 40 then determines whether the detected recording medium S is a check or a passbook (step S12). The CPU 40 can acquire information sent from the host computer 200 and determine the type of the recording medium S based on this information, or the CPU 40 can detect the position of the leading end or a side edge of the recording medium S using the media end sensor 47 or media width sensor 55 and determine the type of the recording medium S based on this position or the detected size.

Alternatively, the CPU 40 can attempt to read the MICR information MS by means of the magnetic head 34 based on the position of the leading end or side edge of the recording medium S detected using the media end sensor 47 or media width sensor 55, and determine the type of the recording medium S by determining if the MICR information MS is in a specific position as a result of this reading attempt.

In this embodiment, the CPU 40 acquires information for identifying the type of recording medium S (check or passbook in this example), information related to the size of the check, for example, when the recording medium S is a check, information related to the position where the MICR information MS is recorded, and information related to the transportation distance from the host computer 200, and determines whether the recording medium S is a check or a passbook based on this information.

If the recording medium S is a check (step S12 returns Yes), the CPU 40 determines if a MICR information read command was received from the host computer 200 (step S13). If the CPU 40 determines a MICR information read command was received from the host computer 200 (step S13 returns Yes), control goes to step S14.

Note that the CPU 40 may receive a MICR information read command when information for identifying the type of recording medium S (check or passbook) to be read is acquired from the host computer 200 in step S12.

Figure 7:
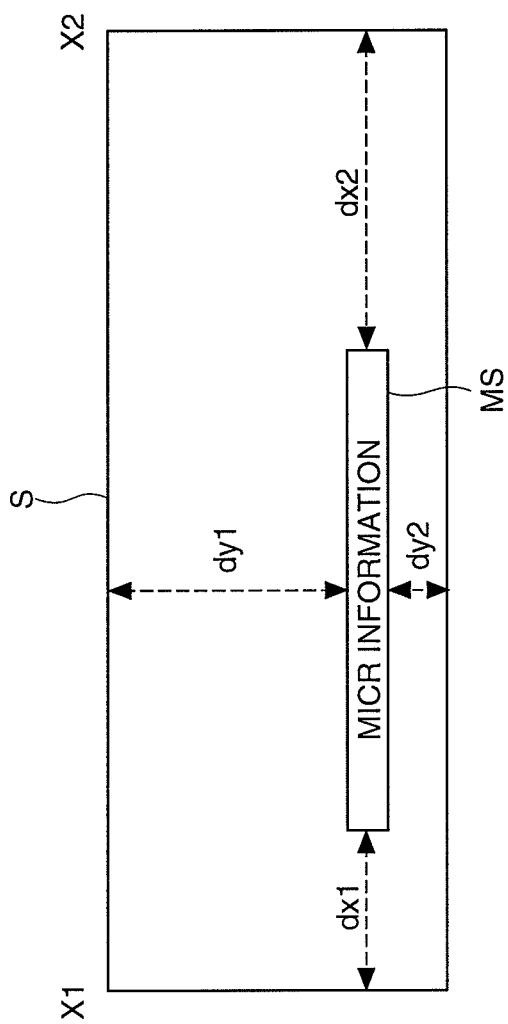
FIG. 7 shows an example position of MICR information printed on a check relative to ends of the check.

More specifically, as shown in FIG. 7, the CPU 40 receives information related to the offset distances dx1, dx2, dy1, dy2 of the MICR information MS from the four sides of the recording medium S; information related to the transportation distance Y1 from the alignment position of the alignment plate 28 to the position where the magnetic data reading unit 29 can read the MICR information MS; information related to the transportation distance Y2 until the leading end of the recording medium S reaches the front scanner 111 and back scanner 112; and information related to the transportation distance Y3 until the trailing end of the recording medium S reaches the front scanner 111 and back scanner 112. Note that the information acquired from the recording mechanism unit 20 is not limited to the foregoing. Additional information may also be received. And other information can be received instead of the foregoing information.

The CPU 40 then retracts the alignment plate 28 from the transportation path P, conveys the recording medium S by means of the media transportation mechanism 100 until at least the leading end of the recording medium S is directly below the media width sensor 55, then drives the carriage drive motor 56 (FIG. 5) to move the carriage 19 in the main scanning direction, and detects the widthwise position of the recording medium S based on the output signal from the media width sensor 55 and the position of the carriage 19 in the main scanning direction (step S14).

More specifically, the leading end of the recording medium S is positioned in the Y direction by the alignment process in step S11, but the position of the recording medium S in the X direction is unknown because the recording medium S may be inserted anywhere in the manual insertion opening 15. As a result, the media edge positions X1 and X2 (see FIG. 7) are detected in the X direction by the process executed in step S13. The media edge positions X1 and X2 thus detected are stored in RAM 41.

The CPU 40 then monitors the output signal from the media end sensor 47 while conveying the recording medium S by means of the media transportation mechanism 100, and detects the trailing end of the recording medium S (step S15).

The CPU 40 then conveys the recording medium S by means of the media transportation mechanism 100 based on the information Y1 (the transportation distance until the MICR information MS reaches the reading position of the magnetic data reading unit 29) received form the host computer 200 (step S16).

As a result, the recording medium S is positioned where the MICR information MS printed thereon can be read by the magnetic data reading unit 29 (step S16). The CPU 40 then calculates the scanning range (X1+dx1) to (X2−dx2) based on the media edge positions X1 and X2 detected in step S13 and the offset distances dx1, dx2 received in step S12.

Note that in order to provide a margin D of error, for example, the actual scanning range can be set to a range (X1+dx1−D) to (X2−dx2+D) (where D<dx1, dx2) that is larger than the foregoing calculated range.

The CPU 40 then drives the magnetic head drive motor 64 of the magnetic data reading unit 29 to move the magnetic head unit 62 supported on the magnetic head guide shafts 60, 61 through the scanning range in the main scanning direction X (step S17), and executes the magnetic information process reading the MICR information MS from the recording medium S by means of the magnetic head 34 of the magnetic head unit 62 (step S18).

At this time the CPU 40 detects the position of the MICR information MS in the main scanning direction based on the output signal from the magnetic head 34 and the position of the magnetic head 34 in the main scanning direction, and calculates dx1' and dx2' as the offset distances based on actual measurements. Note that the location of the MICR information MS may be determined directly instead of determining dx1' and dx2' as the offset distances. Note, further, that the calculated offset distances dx1' and dx2' are stored in RAM 41.

The information (MICR information) read by the magnetic head 34 is digitized by the gate array 45 and output to the CPU 40. Based on the data supplied from the gate array 45, the CPU 40 interprets and converts the character information to text information (step S19).

The CPU 40 determines if there are any characters that could not be identified in the MICR information MS interpretation process executed in step S19 (step S20). Control goes to step S21 if there are any characters that could not be interpreted (step S20 returns Yes), and otherwise (step S20 returns No) control goes to step S26.

For example, if the information acquired by the interpretation process in step S19 is "01?3456789" because the third character (denoted by a question mark (?) in this example) could not interpreted, step S20 returns Yes and control goes to step S21.

In this situation the CPU 40 then moves the recording medium S to the reading position of the front scanner 111 and back scanner 112 (step S21) based on the information received in step S13 related to the transportation distance Y2 until the leading end of the recording medium S reaches the front scanner 111 and back scanner 112.

The CPU 40 then optically reads the MICR information MS (step S22) and proceeds to step S23. While conveying the recording medium S in the subscanning direction by means of the media transportation mechanism 100 in step S22, the CPU 40 simultaneously reads the front and back of the recording medium S by means of the front scanner 111 and back scanner 112, converts the scanner output to image signals, and supplies the signals to the gate array 45.

The CPU 40 then stops scanning based on the information received in step S12 related to the transportation distance Y3 until the trailing end of the recording medium S reaches the front scanner 111 and back scanner 112. The CPU 40 also determines the range of the recording medium S that is read in the X direction by the front scanner 111 and back scanner 112 at this time based on the widthwise X1 and X2 detected in step S13. More specifically, the gate array 45 acquires only the signals output from the photoreceptor units in the range corresponding to this widthwise position, and acquires only the signals output from the photoreceptor units in the period determined by the transportation distances Y2 and Y3.

Note that transportation distance Y3 can be determined based on values obtained from the leading end and trailing end of the recording medium S detected by the media end sensor 47. More specifically, the difference of the leading end and trailing end transportation distances of the recording medium S detected by the media end sensor 47 can be obtained, and Y3 can be determined by adding this difference to Y2.

The gate array 45 quantizes and converts the image signal to digital image data, and supplies the digital image data to the CPU 40. The CPU 40 stores the acquired image data in RAM 41. Note that this stored check image data is sent through the interface 43 to the host computer 200 in step S26 described below.

The host computer 200 executes a transaction process by sending the received information from the receiving bank to the paying bank. More specifically, instead of delivering the actual physical check for processing, the check is processed electronically by converting the information read from the check to image data, and sending the image data from the receiving bank that received the check to a host computer in the paying bank on which the check was issued.

In step S23 the CPU 40 executes a character recognition process based on the image data read by the back scanner 112 in step S22. More specifically, based on the measured offset distances dx1' and dx2' acquired by the process in step S15, and the distances dy1 and dy2 received in step S13, the CPU 40 identifies the area in the image data where the MICR information MS is contained, extracts the image data contained in that area, and applies the character recognition process to the extracted image data.

Note that a common OCR process known from the literature can be used as this character recognition process. Using the example described above, this process acquires "012345678?" as the recognition result, for example. Note that recognition of the last character, denoted by a question mark (?), failed in this example.

The CPU 40 then determines if recognition of the characters that could not be read in step S19 succeeded (step S24). If recognition succeeded (step S24 returns Yes), control goes to step S25. Otherwise (step S24 returns No), control goes to step S29.

Because recognition of the character that could not be interpreted (the third character, "2") in the recognition process in step S19 in the above example succeeded here, control goes to step S25.

In step S25 the CPU 40 combines the recognition results from step S19 and step S23. More specifically, by combining the string "01?3456789" recognized in step S19 with the string "012345678?" acquired as the recognition result in step S23, the string "0123456789" is obtained.

However, if recognition of the unrecognized characters fails (step S24 returns No), control goes to step S29, and the CPU 40 reports an error to the host computer 200 and ends the process.

The CPU 40 then sends the MICR information MS obtained by the recognition process through the interface 43 to the host computer 200, and sends the image data for both sides of the recording medium S captured by the reading process in step S22 and stored in RAM 41 through the interface 43 to the host computer 200 (step S26).

The CPU 40 then waits until a command for printing an endorsement is received from the host computer 200 (step S27). When an endorsement printing command is received, the CPU 40 reverses the media feed motor 26 and conveys the recording medium S until it is below the recording head 18, and then drives the carriage drive motor 56 and recording head 18 to print an endorsement on the back of the recording medium S (step S28). When printing the endorsement is completed, the CPU 40 drives the media feed motor 26 again and discharges the recording medium S from the manual insertion opening 15.

Note that instead of discharging the recording medium S, the entire front and back surfaces of the recording medium S can be scanned by the front scanner 111 and back scanner 112 to capture images of the processed check, and this image data can be sent from the receiving bank to the host computer of the paying bank for electronic processing using the final images of the processed check. In this situation the reliability and accuracy of the transaction can be assured by using image data as the data showing that the check has been processed.

A case in which a check is inserted as the recording medium S is described above. A process such as described below is executed when a passbook is inserted as the recording medium S.

When it is determined that the detected recording medium S is a passbook, and not a check, in step S12, and the host computer 200 asserts a command to execute a passbook process, the CPU 40 corrects skewing of the passbook by means of the alignment plate 28 in the transportation path P, then conveys the recording medium S by means of the media transportation mechanism 100, drives the magnetic head drive motor 64 of the magnetic data reading unit 29, and magnetically reads and/or writes information in the magnetic stripe on the recording medium S by means of the magnetic head 34 (step S31).

The CPU 40 then records an image including text by means of the recording head 18 on the recording surface of the recording medium S, that is, passbook (step S32), discharges the recording medium S from the manual insertion opening 15 by means of the media transportation mechanism 100 (step S33), and then ends the process.

As described above, in a dot impact printer 10 (according to this embodiment) that conveys a recording medium S and records images, a magnetic head 34 that is disposed to a magnetic head unit 62 and magnetically reads MICR information recorded on the recording medium S, a recording head 18 that is mounted on a separate carriage from the magnetic head 34 and records images on the recording medium S, and a back scanner 112 that optically reads MICR information recorded on the recording medium S, are disposed in sequence to the transportation path P of the recording medium S. When reading the MICR information by means of the magnetic head 34 does not succeed, the CPU 40 conveys the recording medium S to the back scanner 112 and reads the MICR information by means of the back scanner 112, then compares the reading result of the magnetic head 34 with the reading result of the back scanner 112, and identifies the MICR information.

As a result, if the recording medium S is not conveyed to the back scanner 112 when the MICR information is successfully read magnetically, unnecessary transportation operations may be eliminated, the accuracy of reading the MICR information may be improved by combining different reading methods, and the processing speed may be improved.

More particularly, the recording medium S is inserted from a manual insertion opening 15 rendered in the front of the dot impact printer 10, and the recording medium S is discharged from the same manual insertion opening 15 after the recording medium S is processed inside the dot impact printer 10. More specifically, the dot impact printer 10 is configured to reverse the transportation direction and convey the recording medium S bidirectionally inside the dot impact printer 10.

As a result, if the recording medium S is not conveyed to the back scanner 112 when magnetically reading the MICR information succeeds, the recording medium S transportation path is greatly shortened and improved throughput can be expected.

In addition, because optical reading is enabled by simply extending the transportation path when magnetically reading the MICR information does not succeed, the MICR information can be read easily with high accuracy.

Yet further, by controlling the media transportation mechanism 100 by means of the CPU 40, the recording medium S can be conveyed bidirectionally, and the number of times the MICR information is read magnetically, and the number of times the MICR information is read optically, can be freely set independently of the other. The number of magnetic and optical reading operations can thus be increased appropriately, and the MICR information reading accuracy can be further improved.

Furthermore, because a magnetic head 34 that is disposed to a magnetic head unit 62, a recording head 18 that is mounted on a separate carriage from the magnetic head 34, and a back scanner 112 are disposed in sequence to the transportation path P of the recording medium S, and the magnetic head 34 and the recording head 18 can scan separately to the other in the configuration described above, magnetic reading and image recording processes can be applied to various types of recording media S, including bound media such as passbooks and single-sheet media such as checks, and a configuration enabling processing a wide range of recording media by means of a single device can be achieved.

In addition because image data including the MICR information is captured using a front scanner 111 and back scanner 112, there is no need to attach a scanner to the carriage of the magnetic head 34. A large carriage is therefore not needed and increasing the size of the drive mechanism can be prevented.

Yet further, because the scanning range of the magnetic head 34 and the back scanner 112 is determined based on the detection result from the media width sensor 55, this embodiment can reliably scan the desired target region regardless of where the recording medium S is positioned.

In addition, because the area containing the MICR information MS can be extracted from the image data captured by the back scanner 112 based on the position of the MICR information MS detected by the magnetic head 34, the extraction area can be reliably identified, and the time required for the recognition process can be shortened by minimizing the extracted area.

Yet further, this embodiment can reliably identify the medium to be processed because whether the medium is a check or a passbook is determined based on information supplied from the host computer 200. In addition, the appropriate process can be reliably applied to each type of recording medium by sending information related to the size of the medium to be processed and the amount of control together with the information for identifying the medium to be processed.

A preferred embodiment of the invention is described above, but the invention is not so limited.

For example, the reading process of the magnetic head 34 is executed only once (single scan) in the embodiment described above, but the magnetic head 34 can scan multiple times in the main scanning direction while the medium is conveyed in the subscanning direction, and the recognition process can be executed using the signals with the greatest strength (highest amplitude). Alternatively, the same position can be scanned in the main scanning direction multiple times without scanning in the subscanning direction while changing the signal gain for each main scan in the gate array 45.

Furthermore, the back scanner 112 is described as scanning with light in the visible spectrum, but scanning with infrared light is also possible. Because the infrared absorption of magnetic ink is higher than that of normal ink, it is possible to capture only the characters printed in magnetic ink by using infrared light. As a result, high speed processing may be achieved because the process of identifying the area containing the MICR information MS can be simplified.

Furthermore, reading with the magnetic head 34 precedes imaging by means of the front scanner 111 and back scanner 112 in the embodiment described above, but imaging by means of the front scanner 111 and back scanner 112 can precede reading by means of the magnetic head 34. In this case, the area where the MICR information MS is recorded can be identified based on the result of the OCR process, and the identified area can then read by means of the magnetic head 34.

In addition, because the area where the MICR information MS is recorded can be easily identified when infrared light is used for scanning, the area read by the magnetic head 34 can be controlled based on the result.

It should be noted that the specific configurations of the media end sensor 47 and the media width sensor 55 are not limited to the foregoing embodiment, the function blocks shown in the block diagram in FIG. 5 can be achieved by hardware and software working together, the actual hardware configuration and software specifications can be determined as desired, and other detailed aspects of the configuration can be changed as desired.

Note, further, that the invention is not limited to dot impact printers, and can be used with inkjet printers and thermal printers that record images by heating a heat-sensitive medium such as thermal paper. The invention is also not limited to stand-alone printers such as dot impact printers 10, can be incorporated in other devices such as ATMs (automated teller machines) and CD (cash dispenser) machines, and can be adapted to a wide range of other devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims.

What is claimed is:

1. A recording device that conveys a recording medium along a transportation path and records images, the recording device comprising:
    a drive mechanism to convey the recording medium along the transportation path;
    a magnetic reading unit that is mounted on a first carriage disposed at a first position along the transportation path and magnetically reads magnetic ink character recognition (MICR) information recorded on the recording medium;
    a recording head that is mounted on a second carriage disposed at a second position along the transportation path and records images on the recording medium, the second carriage being different from the first carriage;
    an optical reading unit disposed at a third position along the transportation path that optically reads MICR information recorded on the recording medium, wherein the first, second, and third positions are three different positions; and
    a control unit operatively coupled with the drive mechanism, the magnetic reading unit, the recording head, and the optical reading unit, wherein the control unit, when reading the MICR information by means of the magnetic reading unit does not succeed,
    conveys the recording medium to the optical reading unit,
    reads the MICR information by means of the optical reading unit,
    compares a first reading result from the magnetic reading unit and a second reading result from the optical reading unit, and
    identifies the MICR information in response to the first and second reading results.

2. The recording device of claim 1, wherein:
    the control unit determines if the recording medium is a slip on which the MICR information is recorded, or is an other type of recording medium having a magnetic recording unit in which magnetic information can be recorded, and
    if the recording medium is determined to be the other type of recording medium, the control unit at least one of reads or writes to the magnetic recording unit of the recording medium via the magnetic reading unit.

3. The recording device of claim 2, wherein:
    the recording device is configured to enable communication between the control unit and an externally connected host computer; and
    the control unit determines whether the recording medium is a slip on which the MICR information is recorded or is the other type of recording medium based on information sent from the host computer.

4. The recording device of claim 1, further comprising a detection means that detects an edge position of the recording medium, and wherein the control unit determines a range to be read by the optical reading unit based on the edge position detected by the detection means.

5. The recording device of claim 4, wherein the detection means comprises a media width sensor mounted on the first carriage or the second carriage to determine a width and a position of the recording medium transverse to the transportation path.

6. The recording device of claim 4, wherein the detection means comprises a media end sensor disposed along the transportation path and operable to detect the presence of a recording medium on the transportation path and to detect a position of a trailing end of the recording medium along the transportation path.

7. The recording device of claim 1, further comprising an alignment mechanism disposed along the transportation path to align and position a leading end of the recording medium.

8. The recording device of claim 1, further comprising an insertion opening through which the recording medium is inserted to the transportation path and discharged from the transportation path, and wherein
    the recording head is disposed between the optical reading unit and the insertion opening, and
    the magnetic reading unit is disposed between the recording head and the insertion opening.

9. The recording device of claim 1, wherein the optical reading unit comprises:

a front scanner disposed to optically read information printed on a front side of the recording medium opposite to a back side of the recording medium where the MICR information is recorded; and a back scanner disposed to optically read information printed on the back side of the recording medium.

10. The recording device of claim 1, wherein:

the drive mechanism comprises a media feed motor coupled with a plurality of drive rollers to transport the recording medium along the transportation path; and the magnetic reading unit comprises a magnetic reading unit drive motor to move the magnetic reading unit along the first carriage transverse to the transportation path.

11. The recording device of claim 10, further comprising a carriage drive motor coupled with the recording head to move the recording head along the second carriage transverse to the transportation path.

12. The recording device of claim 11, wherein the control unit comprises:

a motor driver connected to the media feed motor, to the carriage drive motor, and to the magnetic reading unit drive motor, the motor driver operating the motors by supplying a drive signal to each of the motors;

a gate array connected to the motor driver, to the magnetic reading unit, to the recording head, and to the optical reading unit;

a processor connected to the gate array;

a memory connected to the processor and containing instructions that when executed cause the processor to control the motors via the motor driver, control the recording head via the gate array, process a signal generated by the gate array in response to a signal from the magnetic reading unit to identify MICR information recorded on the recording medium, and process a signal generated by the gate array in response to a signal from the optical reading unit to identify MICR information recorded on the recording medium; and a communication interface connected to the processor and operable to transmit the identified MICR information to a host computer.

13. A method for reading magnetic ink character recognition (MICR) information recorded on a recording medium, the method comprising:

conveying a recording medium along a transportation path to a magnetic reading unit;

reading the MICR information with the magnetic reading unit;

identifying MICR information recorded on the recording medium in response to the reading of the MICR information with the magnetic reading unit;

determining whether some of the recorded MICR information could not be identified; and in response to determining that some of the recorded MICR information was not identified, conveying the recording medium along the transportation path to an optical reading unit disposed at a different position along the transportation path than the magnetic reading unit, reading the MICR information with the optical reading unit, identifying MICR information recorded on the recording medium in response to the reading of the MICR information with the optical reading unit, and identifying the MICR information recorded on the recording medium by combining the MICR information identified via the magnetic reading unit with the MICR information identified via the optical reading unit.

14. The method of claim 13, further comprising:

conveying the recording medium along the transportation path to contact an alignment feature to align the recording medium relative to the transportation path and to determine a position of the recording medium along the transportation path.

15. The method of claim 14, further comprising:

measuring a position of a trailing end of the recording medium along the transportation path with a media end sensor disposed along the transportation path;

measuring a width of the recording medium and a position of the recording medium transverse to the transportation path; and determining a portion of the recording medium to be read by at least one of the magnetic reading unit or the optical reading unit.

16. The method of claim 13, further comprising:

in response to a successful identification of all the MICR information recorded on the recording medium, transmitting the identified MICR information to a host computer;

receiving a command from the host computer to print an endorsement on the recording medium;

conveying the recording medium to a recording head; and printing the endorsement on the recording medium with the recording head.

17. The method of claim 13, further comprising:

in response to an unsuccessful identification of all the MICR information on the recording medium, displaying an error message.

18. The method of claim 13, further comprising:

transmitting an image of the recording medium captured by the optical reading unit to a host computer.

19. A method of claim 13, wherein the recording medium is a check being processed.

* * * * *